(12) United States Patent
Mangalore et al.

(10) Patent No.: US 10,977,342 B2
(45) Date of Patent: Apr. 13, 2021

(54) HIGH DEFINITION SECURE PLAYBACK WITH DOWNLOADABLE DRM FOR ANDROID PLATFORMS

(71) Applicant: ARRIS Enterprises LLC, Suwanee, GA (US)

(72) Inventors: Geetha Mangalore, San Diego, CA (US); Steven Anderson, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 608 days.

(21) Appl. No.: 15/293,337

(22) Filed: Oct. 14, 2016

(65) Prior Publication Data

US 2017/0109503 A1    Apr. 20, 2017

Related U.S. Application Data

(60) Provisional application No. 62/241,178, filed on Oct. 14, 2015.

(51) Int. Cl.
*G06F 21/10*      (2013.01)
*H04L 9/06*      (2006.01)
(Continued)

(52) U.S. Cl.
CPC .............. *G06F 21/10* (2013.01); *H04L 9/065* (2013.01); *H04N 21/2541* (2013.01);
(Continued)

(58) Field of Classification Search
CPC .......................... G06F 21/10; H04N 21/2541; H04N 21/4405; H04N 21/4627; H04N 21/41415;
(Continued)

(56) References Cited

U.S. PATENT DOCUMENTS

| 8,813,246 B2 * | 8/2014 | Hierro | G06F 21/10 |
| | | | 726/27 |
| 2003/0173400 A1 * | 9/2003 | Morita | G06F 21/78 |
| | | | 235/380 |

(Continued)

FOREIGN PATENT DOCUMENTS

| EP | 2453378 A2 | 5/2012 |
| EP | 2743856 A1 | 6/2014 |

OTHER PUBLICATIONS

PCT Invitation to Pay Additional Fees (Form ISA/206), Re: Application No. PCT/US2016/056944, dated Jan. 23, 2017.
PCT Search Report & Written Opinion, Re: Application No. PCT/US2016/056944, dated Mar. 16, 2017.
European Office Action dated Mar. 24, 2020 for European Patent Application No. 16791159.3.

*Primary Examiner* — Mohammed Waliullah
(74) *Attorney, Agent, or Firm* — Chernoff, Vilhauer, McClung & Stenzel, LLP

(57) ABSTRACT

A Trustonic DRM Plug-in is provided that can be downloaded and operate in conjunction with an Android framework. The solution also includes a PVP with the downloadable DRM. The system includes components that can be added by Trustonic based on the Android 4.3 Framework in addition to current t-base 300 that can be used by any DRM vendor. The system enables the DRM to be downloaded in the field since all DRMs could use the standard API services of the Android 4.3 OS. With a codec component employed like H.264 or HEVC that can use the PVP with the downloaded DRM component, the Android video player can use the component to satisfy HD content security requirements.

8 Claims, 6 Drawing Sheets

(51) Int. Cl.
*H04N 21/4627* (2011.01)
*H04N 21/414* (2011.01)
*H04N 21/443* (2011.01)
*H04N 21/4405* (2011.01)
*H04N 21/254* (2011.01)

(52) U.S. Cl.
CPC ... *H04N 21/41415* (2013.01); *H04N 21/4405* (2013.01); *H04N 21/4431* (2013.01); *H04N 21/4627* (2013.01); *H04L 2209/30* (2013.01)

(58) Field of Classification Search
CPC .. H04N 21/4431; H04L 9/065; H04L 2209/30
See application file for complete search history.

(56) References Cited

U.S. PATENT DOCUMENTS

| | | | |
|---|---|---|---|
| 2009/0279705 A1* | 11/2009 | Sun | H04L 9/083 380/279 |
| 2010/0172630 A1* | 7/2010 | Chou | H04N 21/8355 386/252 |
| 2014/0123297 A1 | 5/2014 | Ahn et al. | |
| 2015/0347722 A1* | 12/2015 | Baumgartner | H04L 63/10 726/30 |
| 2016/0277769 A1* | 9/2016 | Sadhwani | H04N 19/46 |
| 2016/0315956 A1* | 10/2016 | Giladi | H04L 63/1416 |
| 2017/0011768 A1* | 1/2017 | Cho | G11B 20/0021 |

* cited by examiner ns that are in hardware or that are already included in the
Android device.

HIGH DEFINITION SECURE PLAYBACK WITH DOWNLOADABLE DRM FOR ANDROID PLATFORMS

CROSS REFERENCE TO RELATED APPLICATION

This Application claims priority under 35 U.S.C. § 119(e) from earlier filed U.S. Provisional Application Ser. No. 64/241,178 filed on Oct. 14, 2015 and incorporated herein by reference in its entirety.

BACKGROUND

Technical Field

The present invention relates to providing a Digital Rights Management (DRM) components as well as a protected video path (PVP) environment to an Android device that can operate in conjunction with encryption or security components that are in hardware or that are already included in the Android device.

Related Art

Media devices that will enable the rendering of premium HD content must re-think the method in which content is rendered. In particular, the HD content when it is still in compressed form is extremely valuable as compared to SD content. Solutions for securing content that were considered "the best we could do" are no longer being accepted by the studios that produce and sell the content. Studios are "raising the bar" for protecting HD content while maintaining a respect to the overall robustness of the processing. Therefore hardware based "Trusted Execution Environments" or TEEs are deemed to be necessary. In addition, the content needs to be handled in robust hardware based protected video path (PVP) environments where all aspects of the handling of the high value compressed video frames are protected from tampering and theft.

The Trustonic "t-base 300 Application Program Interface (API)" includes support for the Global Platform (GP) Client API, GP Internal API and t-play (DRM protected video path PVP API) to support premium content. However, the chip specific implementation of the t-play API is integrated by the chip maker and is not exposed through an Android API. Any separate DRM vendor would have to work with each chip maker that has t-play API support in order to use the Secure Codec on the chip. In addition, the DRM vendor will have to work with each device OEM to integrate with the Android Multimedia Framework. This can be time consuming and costly. DRM vendors can only support provisioning or license handling using the t-base 300 that has been released.

SUMMARY

According to embodiments of the present invention, a Trustonic DRM Plug-in is provided that can be downloaded and operate in conjunction with an Android framework. The solution framework is based upon the Trustonic TEE framework. The solution also includes a PVP with the downloadable DRM.

This system includes components that can be added by Trustonic based on the Android 4.3 Framework in addition to current t-base 300 that can be used by any DRM vendor. The system also enables the DRM to be downloaded in the field since all DRMs could use the standard API services of the Android 4.3 OS. The Android 4.3 framework provides Media Codec, Media Crypto and Media DRM interfaces to develop a player that can handle protected content in different Video/Audio formats. As long as a Codec component like H.264 uses a PVP, the player can use the component to satisfy HD content security requirements. Handling of PVP/Secure buffers is transparent to the application accessed by the API. In one embodiment, the only barrier to use is that the application has to provide encrypted elementary streams (e.g H.264 or HEVC) that can be decrypted by the Crypto Plug-in that is installed.

In one embodiment, the present invention provides a method for providing secure video coding. The method includes the steps of providing downloadable Digital Rights Media (DRM) components that provide for decryption of video, and providing the DRM components so that they interface and are supported by an Android platform Application Program Interface (API). The components are provided so that the API renders encrypted elementary streams, including HEVC, that can be decrypted by a Media Crypto Plug-in to the API in conjunction with decryption by the DRM components, and wherein the DRM components further interface with a Media Codec. Finally, the process provides a PVP enhancement for the Media Codec and the Media Crypto Plug-in to enable an Android hardware chip supporting the Android platform API to use the PVP.

With the downloadable DRM and PVP, in one embodiment of the present invention the video content is rendered by the following steps. First, encrypted video content samples comprising HLS TS segments or DASH segments are passed from a Media Crypto to a t-Crypto Plug-in MIME type. Then the Media Crypto instantiates the t-Crypto plugin and calls a decryption process for the samples. Then the t-Crypto type plugin sends a decryption command to decrypt the encrypted samples to a SM-DRM Trustlet, wherein the encrypted content is stored in a shared memory. Finally, the SM-DRM Trustlet invokes the t-DRM API for decrypting, decoding and rendering of the video content.

With the downloadable DRM and PVP, in one embodiment of the present invention the steps to set a provisioning key are as follows: passing by a Media DRM a request to a t-DRM Plugin; translating by the t-DRM Plugin the requests to commands and sending them to a SM Trustlet through a TAC; getting by the t-DRM Plugin the requests from the SM Trustlet; creating by the t-DRM Plugin a Media DRM session and receiving a session ID; providing by the t-DRM plugin the request to the Media DRM; providing by the Media DRM the response to the t-DRM Plug-in; passing by the t-DRM Plugin the responses to the SM Trustlet through the TAC to process; obtaining via the TAC a provision key request command that is then provided to a Secure Media DRM (SM-DRM) Trustlet; generating in the SM-DRM Trustlet the provision key request based on the key request command; sending by the SM-DRM Trustlet the key request command to the t-DRM Plugin via the TAC; sending by the t-DRM Plugin the provision key request response to the SM-DRM Trustlet; and processing the key response provided by the t-DRM Plugin to generate the key ID and saving the key ID in secure storage.

With the downloadable DRM and PVP, in one embodiment of the present invention the steps to provide a secure playback of video are as follows: calling by a Secure Codec Interface a t-crypto Plugin to provide decryption; sending a decrypt command to the SM-DRM trustlet by the t-crypto Plugin; invoking, by the t-Crypto Plugin the SM-DRM Trustlet decrypt command (CMD); retrieving by the SM-DRM Trustlet a correct key from a Secure Storage; invoking by the SM-DRM Trustlet a t-Play DRM API process; decrypting by the t-Play DRM API using secure buffers the video media; providing the decrypted video media through a Secure Buffer to a Codec; and rendering by the codec the video media.

BRIEF DESCRIPTION OF THE DRAWINGS

Further details of the present invention are explained with the help of the attached drawings in which.

DETAILED DESCRIPTION

I. Overview

Generally, embodiments of the present invention provide downloadable DRM components that can be added to a Trustonic system based on the Android 4.3+ Framework in addition to current t-base 300 that can be used by any DRM vendor. This DRM can be downloaded in the field. This Android 4.3+ framework provides Media Codec, Media Crypto and Media DRM interfaces to enable development of a player that can handle protected content in different Video/Audio formats. The Android 4.3+ framework meaning Android 4.3, 4.4, 5.X and 6.X Embodiments of the present invention also include a PVP. As long as a codec component like H.264 uses a PVP, the player can use the component of the present invention to satisfy HD content security requirements. With embodiments of the present invention installed, handling of PVP/Secure buffers is transparent to the application. In one embodiment, the only requirement is that the application has to provide encrypted elementary streams (e.g H.264) that can be decrypted by the Crypto Plug-in that is installed with the Android API.

Embodiments of the present invention define a proposal for Trustonic to add a Trustonic DRM Plug-in (<t-DRM Plugin) and Trustonic Crypto-Plugin (<t-Crypto Plugin) based on the Android 4.3+ Multimedia Framework that enables a DRM vendor to use the Android MultiMedia Framework to play premium protected content using the standard Android set of APIs. The DRM provider using components of embodiments of the present invention will depend on a DRM Plug-in installed in conjunction with the Crypto Plug-in inside the platform to enable enhanced DRM components to be connected. The Android platforms have the Widevine DRM Plug-in and Crypto Plug-in. In one embodiment, the Crypto Plug-in can support the DASH required AES-CTR content decryption Mode selection, but should not be restricted to supporting other modes. Embodiments of the present invention propose that if the Crypto Plug-in would support the AES-CBC Mode selection, the DASH-TS, Apple Sample, cbcs for DASH and cenc for DASH encryption formats could also be supported.

II. System Components

Figure 1:
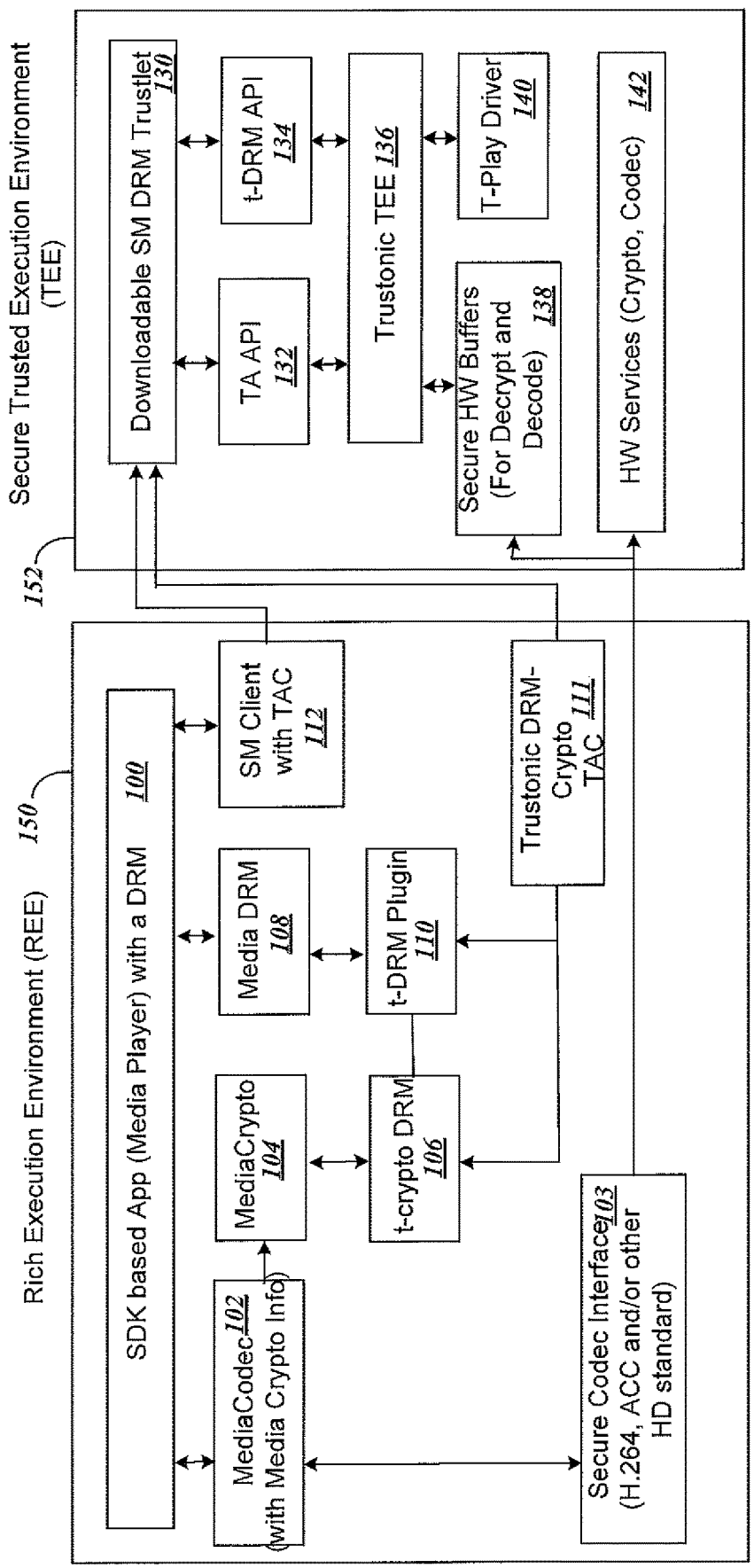
FIG. 1 is a diagram illustrating the Trustonic and Android 4.3+ Multi Media Framework with downloadable DRM components added according to embodiments of the present invention.

FIG. 1 is a diagram illustrating the Trustonic and Android 4.3+ Multi Media Framework with downloadable DRM components of the present invention added according to embodiments of the present invention. The component diagram is based on the Android 4.3 Multimedia framework and Trustonic t-base 300 Software Development Kit (SDK). The diagram shows the different components in the Normal world space Real Execution Environment (REE) 150 and Secure World Trusted Execution Environment (TEE) 152. The components are described in the following paragraphs.

FIG. 1 includes blocks for the normal components of a REE in an Android system 150 that include some connection or interface components of the present invention. FIG. 1 also includes the interfacing components of the TEE 152 that provide the downloadable DRM components and PVP according to embodiments of the present invention.

First, the REE components 150 include a Media Player Application with a DRM 100. The player app interfaces with components including a Media Codec 102, a Media Crypto 104, a Media DRM 108 and a Secure Media (SM) Client with a Trusted Application Connector (TAC) 112. The Media Player App 100 can be one developed using a Media Secure Client (MSC) Software Development Kit (SDK) API service developed by service provider such as Verizon.

The Android Media Codec 102 provides the interface to codec operations and is responsible for instantiating actual codec objects based on the format. The Media Codec API 102 provides an interface to the Media Player application 100 and supports various types of Audio and Video codecs including H.264 and AAC through a Secure Codec interface 103. The interface 103 takes encrypted units as an input, and uses secure buffers 138 to provide an output. In the case of video, the interface 103 will also render the decoded sample since video needs to use a protected path for HD. Audio will be rendered by the Media Player Application 100 and also has to manage A/V synchronization.

If the samples provided to the Media Codec 102 to decode are encrypted, then the application needs to configure the Media Codec with the Media Crypto instance to interface with MediaCrypto 104. The Media Crypto 104 provides the decrypt interface to Media Codec 102 and the actual decrypt function is implemented by the Crypto Plug-in component selected by Media Crypto. In this proposal it will be <t-crypto Plugin 106. The <t-Crypto Plugin 106 implements the decrypt interface required by the Media Crypto. Such decryption will trigger a call to the decrypt function (<t play DRM API) inside the SM DRM Trustlet 130 described subsequently. The Media Codec 102 includes an added Media Crypto Info portion that is used to interface with the MediaCrypto 104, and this Media Crypto Info is made up of Metadata describing the structure of an encrypted input sample.

The REE components 150 further include the Media-Crypto Interface 104 that is used by the Media Codec API 102 to decrypt the encrypted content. The Media Crypto API 104 provides interfaces to decrypt encrypted content provided by the Media Codec object and will use hardware (HW) Secure Buffers 138 as the platform to provide them and if available also a HW accelerator that can be provided with the HW Secure Buffers 138. The Media Crypto interface 104 instantiates the OEM installed Crypto Plugin base and exposes the services of the Crypto Plugin such as the Trustonic <t-Crypto Plugin 106. A buffer's data is considered to be partitioned into "subSamples", each subSample starts with a run of plain, unencrypted bytes followed by a run of encrypted bytes. The numBytesOfClearData can be null to indicate that all data is encrypted.

The REE components 150 further include the Media DRM Interface 108 that is the DRM API interface provided by the Android framework to provision and obtain Licenses from a DRM server. The actual implementation is provided by the DRM Plug-in 110 added by the OEM inside the platform, for example Widevine and PlayReady.

The goal is to add a Trustonic DRM Plug-in (<t DRM Plugin) 108 and Trustonic t-DRM Plug-in (<t DRM Plugin) 110 to the platforms using t-base 300 to enable premium content playback. In this manner, Trustonic has exposed the services of these plugins, including the t-Crypto Plugin 106 and t-DRM Plugin 110 up through the Android 4.3/4.4 framework. The elements 106 and 110 are added to the Normal REE 150 to enable connection of the downloadable DRM according to embodiments of the present invention. The Trustonic DRM-Crypto Trusted Application Connector 111 (TAC) allows an external Secure TEE 152 providing downloadable components of the present invention to connect to the m-Crypto Plugin 106 and the t-DRM Plugin 110 DRM. Providers will merely have to write the contents of the TA for their DRM transactional processing that will be described later with respect to the Secure TEE 152. These plugins provide an abstraction of those DRM services in the TA up to the application. This will support the ability to download a generic DRM.

The Media DRM 108 is an Android Media DRM API. The Media DRM 108 is used to instantiate and interface with the t-DRM Plugin 110. The <t-DRM Plugin 110 provides the interface to the Secure TEE 152 application to provide DRM events and way to trigger setting the key in conjunction with Trustonic Crypto Plug in. The DRM API framework will be used with embodiments of the present invention.

The Secure Media (SM) Client 112 includes a TAC for connection with the Secure TEE 152 to enable it to communicate with a Secure Media (SM) DRM Trustlet 130 in a secure manner. The SM Client is an "optional component" and may be required to authenticate the application to a SM trustlet and handle functionality that is not supported by the Media DRM API 108.

The Secure TEE components 152 include the downloadable SM DRM Trustlet 130 that is the basis of the downloadable components of embodiments of the present invention. The Secure Media DRM Trustlet 130 implements all the secure functions required for generating and processing SM Registration including Key Request messages and then saves the key in Secure Storage to be used by the Trustonic TEE 136. The SM DRM Trustlet 130 interfaces with a TA API 132 and a t-DRM API 134. The SM DRM Trustlet 130 component invokes the t-DRM API 130 to decrypt, decode and render the content. Each DRM vendor controls the contents and actions of the specific vendor using its DRM Trustlet or Trusted Application (TA) API 132.

The Secure TEE 152 also includes a Trustonic TEE 136 that interfaces and controls the TA API 132 and the t-DRM API 134. It also interfaces and controls the Secure HW Buffers 138 for decryption and decoding and the t-play driver that controls video play. The Secure TEE 152 also includes any additional hardware needed for crypto and codec secure interfacing to enable the downloadable secure DRM to function.

Trustonic provides the following components to develop DRM in TEE and PVP in some platforms: (1) a General Purpose (GP) Client Interface API to develop applications in REE: (2) a GP Internal API to develop Trustlets running in TEE; a Framework to download Trustlets to T-Base 300 enabled platforms; and a T-DRM API integrated by certain OEM's to provide secure playback.

Embodiments of the present invention allow for Trustonic is to add a Trustonic Crypto plugin (<t Crypto Plugin), and DRM Plug-in (<t DRM Plugin) interface in addition to the current T-base 300 functionality. This will enable DRM vendors to use the Protected Video path by just using the Android 4.3 Multi Media Framework and by downloading a DRM Trustlet. Since the t-play API can be invoked only by a Trustlet, it will have to be called from the DRM Trustlet. The trigger will be the decrypt command from <t-Crypto Plugin.

Although not shown, components shown in FIG. 1 either individually or together include a processor and memory. The memory provides for data storage and includes software that is executable by the processor to cause the component to perform processes described subsequently according to embodiments of the present invention, as well as to enable the component to receive and transmit data and interact with other components described.

III. Processes for the System

The following sections describe processes that the system is used for with the present invention. The processes include the content flow procedure from the time a video is downloaded to the time it is rendered. The processes further include a sequence of procedures for obtaining a secure key. Finally the processes include the steps for playback.

To enable these processes, embodiments of the present invention provide for Trustonic to have two additional components, as part of their t-base 300 package, which are the <t-DRM Plugin 106 that implements a Media DRM Interface and a <t-Crypto Plugin 110 that implements Media Crypto Interface. The <t-DRM Plugin 106 and <t-Crypto Plugin 110 will implement the Android 4.3 Interface API. The <t-DRM Plugin 106 mainly supports a few interface functions as triggered by Media DRM, basically a pass through. The Provisioning and License requests are generated and processed by the SM Trustlet 130 that is downloaded. The SM Trustlet 130 will store the key, with ID in the secure storage. The SM-DRM Trustlet 130 will use the <t-Play API 140 and other components to decrypt the content after retrieving a key from the secure storage when the decrypt command is issued. The <t-Crypto Plugin 106 can allow selection of AES CBC Mode, in addition to AES-CTR Mode in order to support DASH-TS or Apple sample encryption. Processes that can be implemented using these components are described to follow.

A. Content Flow

Figure 2:
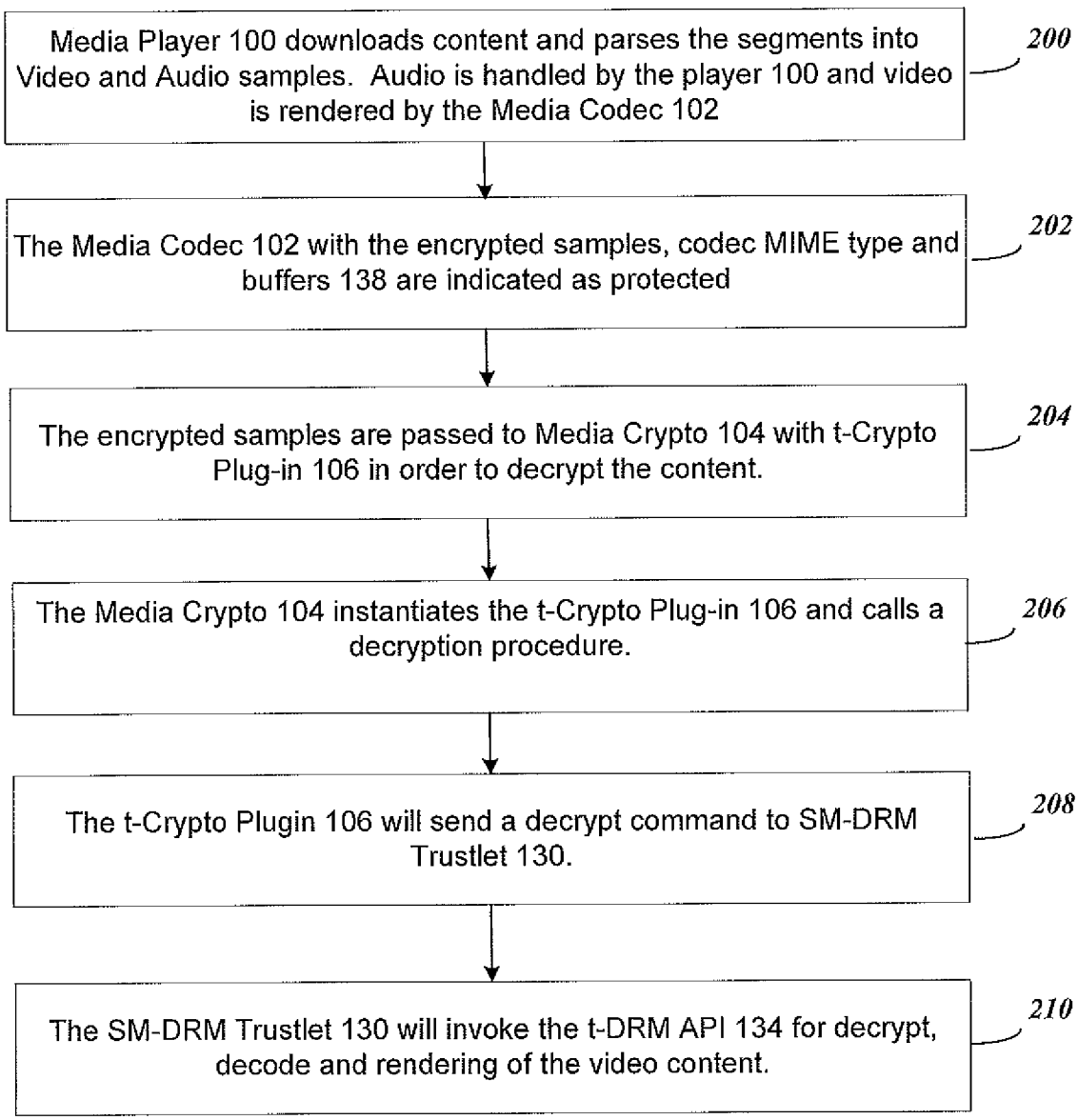
FIG. 2 shows the content flow for the downloadable DRM from the time that a video is downloaded to the time the video is rendered using embodiments of the present invention.

FIG. 2 shows the content flow for the downloadable DRM from the time that a video is downloaded to the time the video is rendered using embodiments of the present invention with the Android Media Framework and Trustonic based modules. The content flow is summarized in following steps.

Initially, in step 200 the Media Player 100 downloads content and parses the segments into Video and Audio samples. The audio is handled by the player 100 and video is rendered by the Media Codec 102. Next, in step 202 the Media Codec 102 with the encrypted samples, codec MIME type and buffers 138 are indicated as protected.

Further steps for the content flow are provided with downloadable DRM components of embodiments of the present invention. In step 204, the encrypted samples are passed to Media Crypto 104 with t-Crypto Plug-in 106 in order to decrypt the content. Next in step 206, the Media Crypto 104 instantiates the t-Crypto Plug-in 106 and calls a decryption procedure. In step 208, the t-Crypto Plugin 106 will send a decrypt command to the SM-DRM Trustlet 130. Finally, in step 210, the SM-DRM Trustlet 130 will invoke the t-DRM API 134 for decrypt, decode and rendering of the video content.

B. Application Sequence to SetKey in Normal World REE

Figure 3:
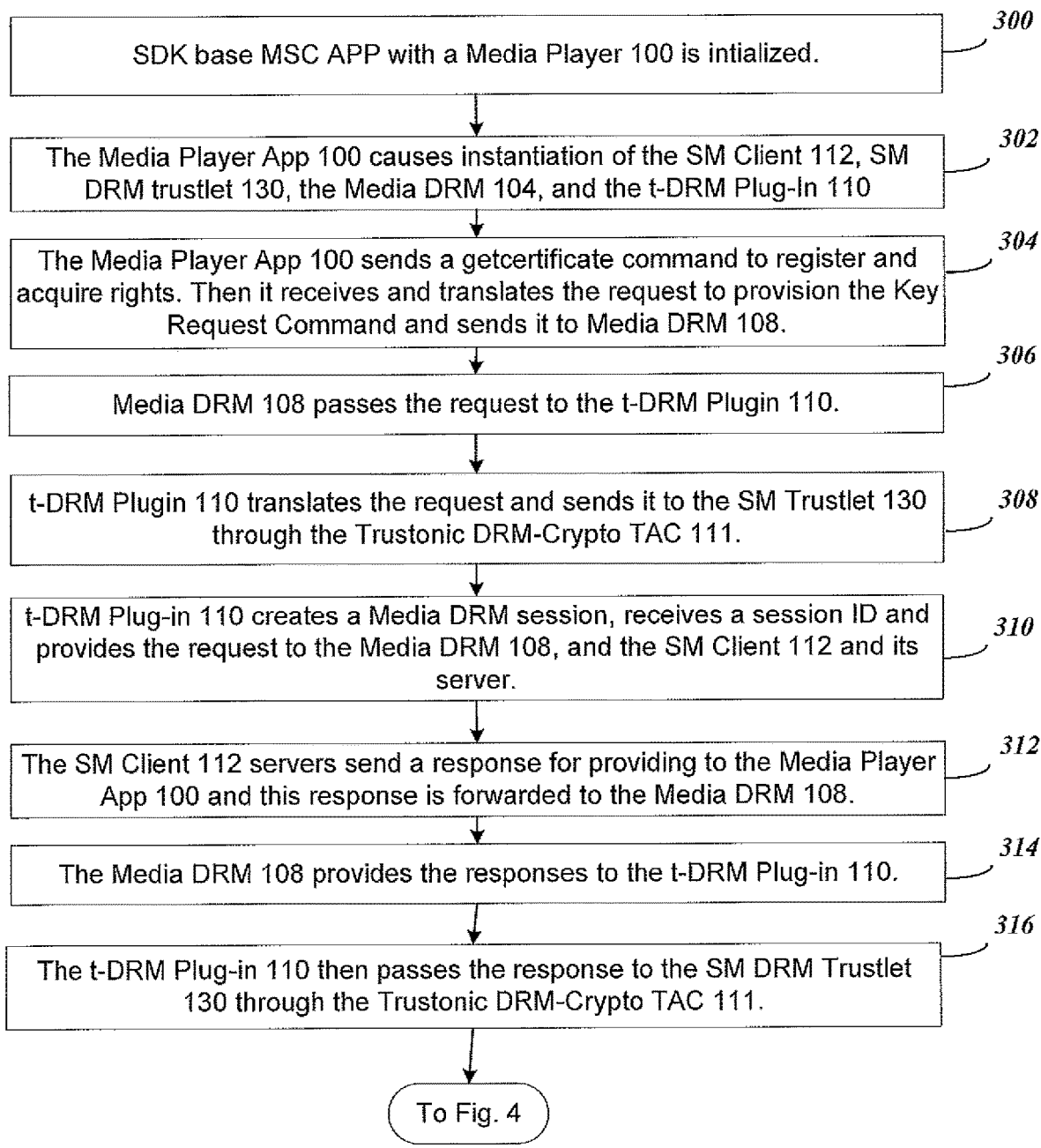
FIG. 3 shows a process sequence for setting a secure key using embodiments of the present invention, with steps performed by Normal REE components.
Figure 4:
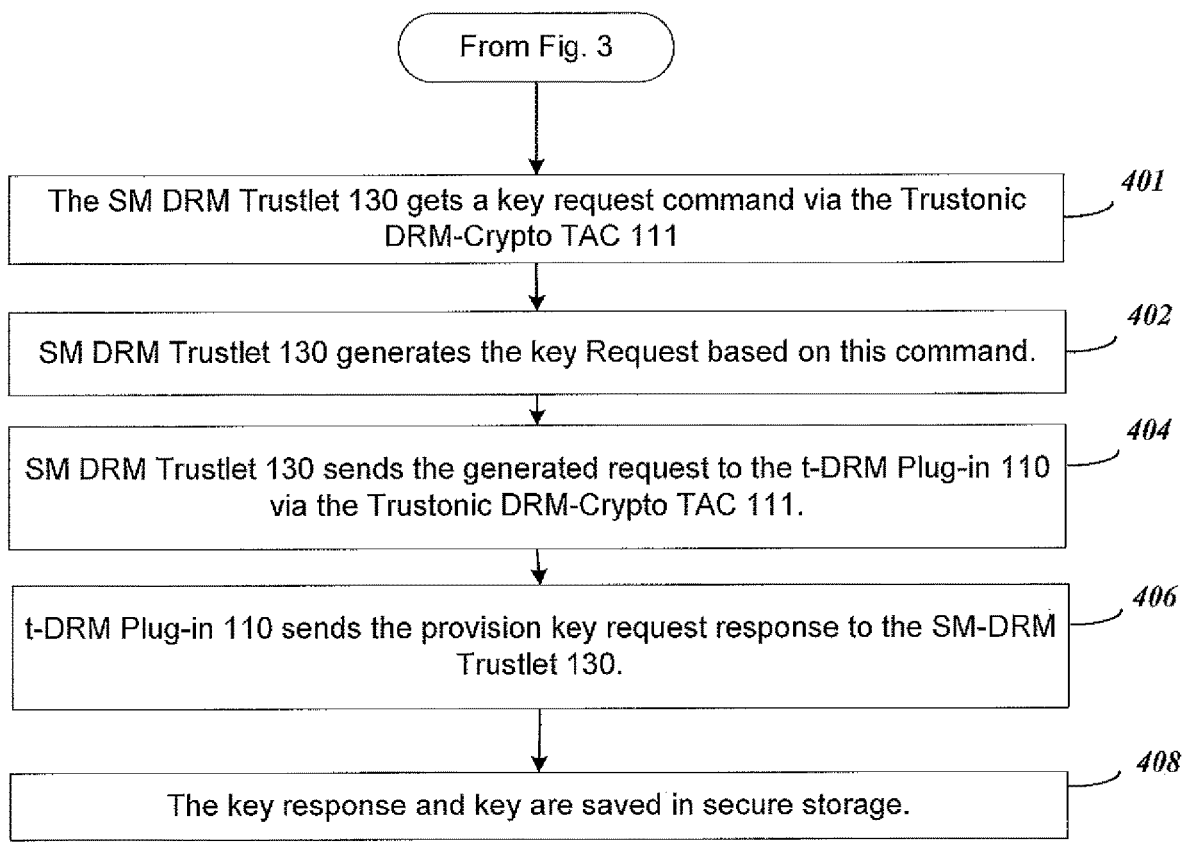
FIG. 4 shows process steps following those in FIG. 3 that are performed by Secure TEE components to complete setting of a secure key.

FIGS. 3-4 show a process sequence for setting a secure key. FIG. 3 shows the steps that are performed by the Normal REE components 150, while FIG. 4 shows the steps that are performed using the Secure TEE components 152.

In FIG. 3, initially in step 300 the SDK base MSC APP Media Player 100 is initialized. Next in step 302, the Media Player App 100 causes instantiation of the SM Client 112, SM DRM trustlet 130, the Media DRM 104, and the t-DRM Plug-In 110. In step 304, the Media Player App 100 sends a getcertificate command to register and acquire rights. Then Media Player 100 receives and translates the request to provision the Key Request Command and sends it to Media DRM 108. In step 306, Media DRM 108 passes the request to the t-DRM Plugin 110. In step 308, t-DRM Plugin 110 translates the request and sends it to the SM Trustlet 130 through the Trustonic DRM-Crypto TAC 111. In step 310, t-DRM Plug-in 110 creates a Media DRM session, receives a session ID and provides the request to the Media DRM 108, and the SM Client 112 and its server. In step 312, The SM Client 112 servers send a response for providing to the Media Player App 100 and this response is forwarded to the Media DRM 108. In step 314, The Media DRM 108 provides the responses to the t-DRM Plug-in 110. In step 316, the t-DRM Plug-in 110 then passes the response to the SM DRM Trustlet 130 through the Trustonic DRM-Crypto TAC 111. The process then continues to FIG. 4 for the steps that are performed by the Secure TEE.

In FIG. 4, initially in step 401 the SM DRM Trustlet 130 gets a key request command via the Trustonic DRM-Crypto TAC 111. Next, in step 402 SM DRM Trustlet 130 generates the key request based on this command. In step 404, the SM DRM Trustlet 130 sends the generated request to the t-DRM Plug-in 110 via the Trustonic DRM-Crypto TAC 111. In step 406, t-DRM Plug-in 110 sends the provision key request response to the SM-DRM Trustlet 130. Finally, in step 408, the key response and key are saved in secure storage.

C. Application Sequence for a Secure Playback

Figure 5:
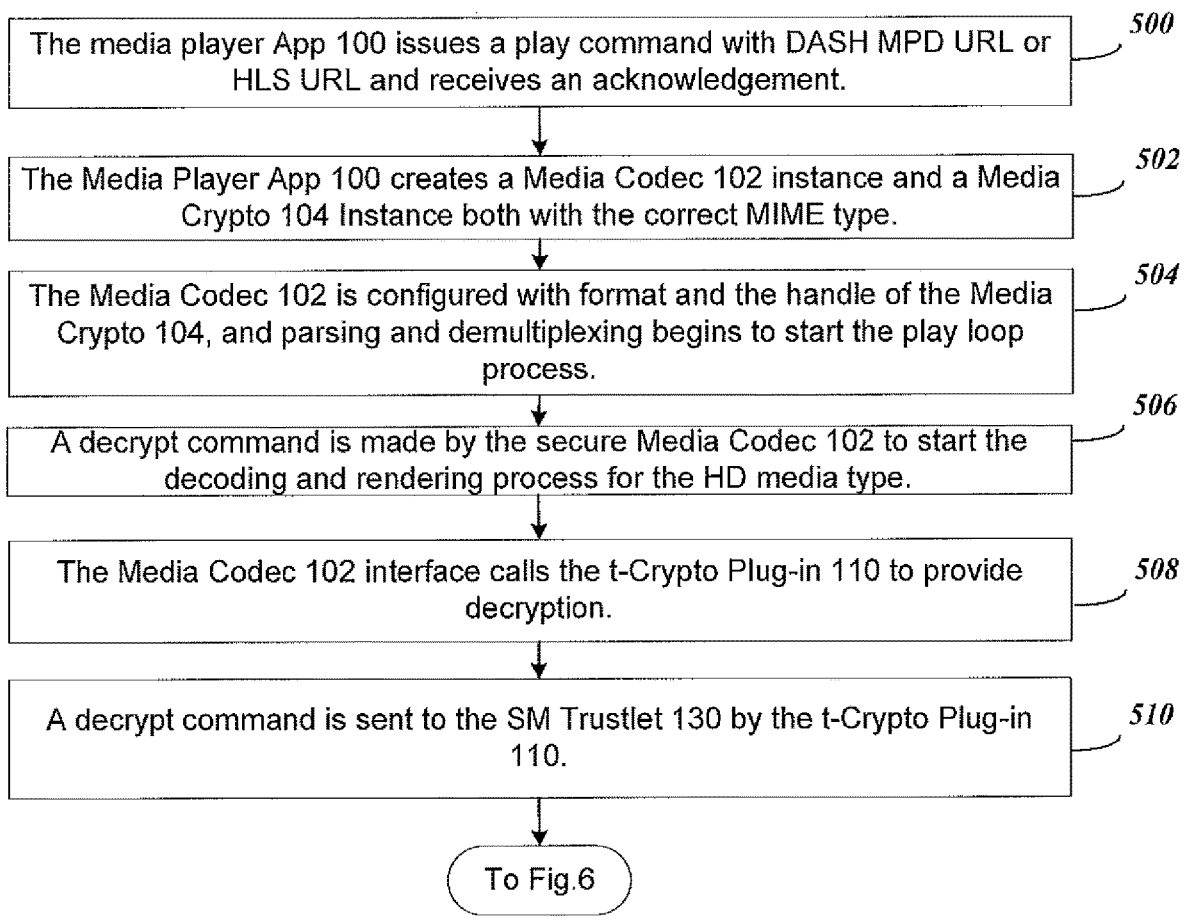
FIG. 5 shows a process sequence for providing a secure playback sequence using embodiments of the present invention, with steps performed by Normal REE components.
Figure 6:
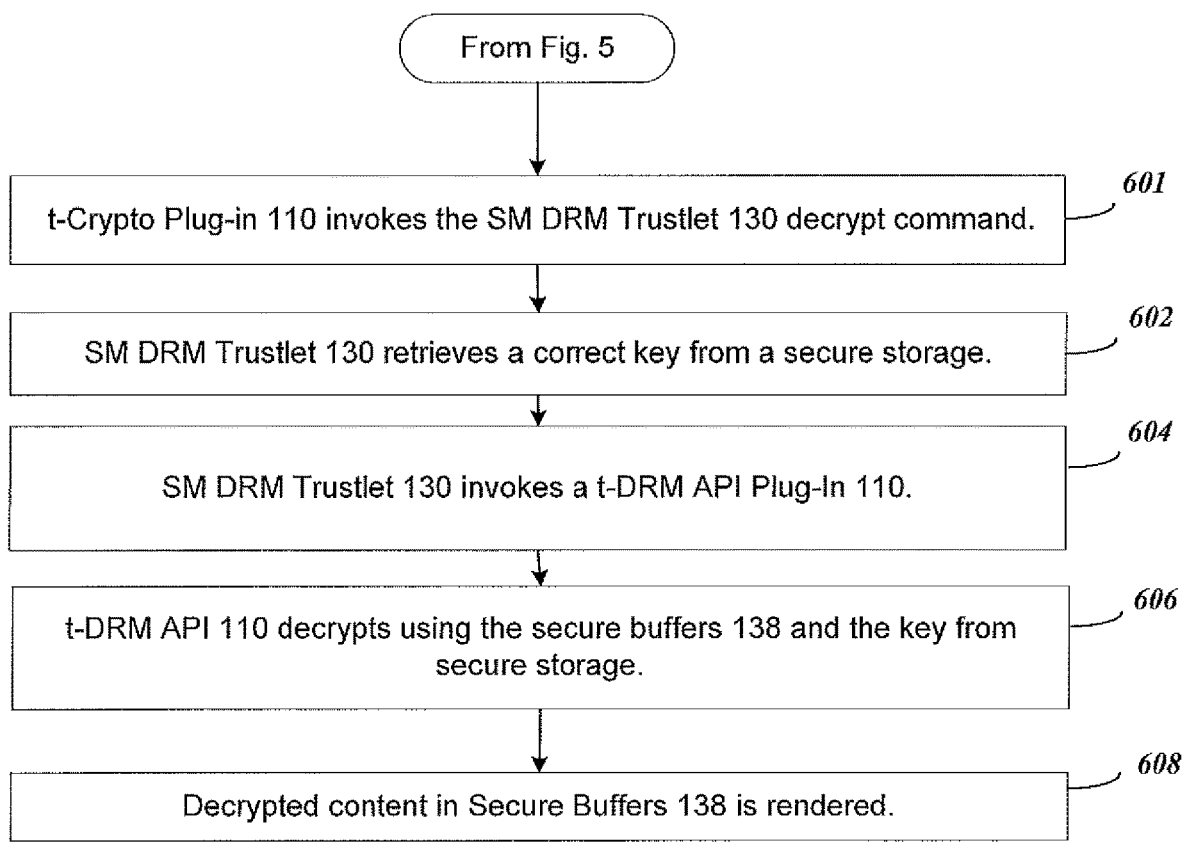
FIG. 6 shows process steps following those in FIG. 5 that are performed by Secure TEE components to complete a secure playback.

FIGS. 5-6 show a process sequence for providing a secure playback operation. FIG. 5 shows the steps that are performed by the Normal REE components 150, while FIG. 6 shows the steps that are performed using the Secure TEE components 152.

In FIG. 5, initially in step 500 the media player App 100 issues a play command with DASH MPD URL or HLS URL and receives an acknowledgement. Next in step 502, the Media Player App 100 creates a Media Codec 102 instance and a Media Crypto 104 Instance both with the correct MIME type. In step 504, the Media Codec 102 is configured with format and the handle of the Media Crypto 104, and parsing and demultiplexing begins to start the play loop process. In step 506, a decrypt command is made by the secure Media Codec 102 to start the decoding and rendering process for the HD media type. In step 508, the Media Codec 102 interface calls the t-Crypto Plug-in 110 to provide decryption. Finally, in step 510 a decrypt command is sent to the SM Trustlet 130 by the t-Crypto Plug-in 110. The process then continues to FIG. 6 for the steps that are performed by the Secure TEE.

In FIG. 6, initially in step 601 t-Crypto Plug-in 110 invokes the SM DRM Trustlet 130 decrypt command. Next, in step 602, the SM DRM Trustlet 130 retrieves a correct key from a secure storage. In step 604, the SM DRM Trustlet 130 invokes the t-DRM API Plug-In. In step 606, the t-DRM API 110 decrypts using the secure buffers 138 and the key from secure storage. Finally in step 608 the decrypted content in secure buffers 138 is rendered.

Although the present invention has been described above with particularity, this was merely to teach one of ordinary skill in the art how to make and use the invention. Many additional modifications will fall within the scope of the invention as that scope is defined by the following claims.

What is claimed:

1. A method of providing secure video coding comprising:
   providing a downloadable Digital Rights Media (DRM) for hardware device components that can be any arbitrary DRM that is compatible with different Application Program Interfaces (APIs), wherein the DRM uses the hardware components that provide for decryption of video;
   interfacing the DRM hardware components with and to be supported by an Android platform API;
   wherein the API renders encrypted elementary streams, including High Efficiency Video Coding (HEVC), that are decrypted by a Media Crypto Plug-in to the API in conjunction with DRM message processing by the DRM, wherein the Media Crypto Plug-in is included in the hardware components of the DRM;
   wherein the DRM further interfaces with a Media Codec;
   providing a Protected Video Path (PVP) enhancement for the Media Codec and the Media Crypto Plug-in by interfacing, using the DRM, with an Android hardware chip supporting the PVP in the Android platform API to use the PVP;
   passing encrypted samples from video content comprising encrypted media segments to the Media Crypto Plug-in MIME type of the DRM;
   instantiating by the Media Crypto a t-Crypto Plug-in and calling a decryption process for the samples;
   sending a decryption command to decrypt the encrypted samples from the t-Crypto Plug-in to a SM-DRM Trustlet of the DRM, wherein the encrypted content is stored in a shared memory; and
   invoking, by the SM-DRM Trustlet, a t-DRM API for decrypting, decoding and rendering of the video content.

2. The method of claim 1, wherein Android platform includes the Android 4.3, 4.4, 5.X and 6.X media framework.

3. The method of claim 1, wherein the DRM components, the Media Codec and the Media Crypto Plug-in support SD, HD and 4K content.

4. The method of claim 1, wherein the Media Crypto provides compressed video frames that are protected from tampering and theft.

5. The method of claim 1, wherein the DRM components are provided in addition to current t-base 300 in hardware of the Media Codec.

6. The method of claim 1, wherein the Media Crypto plug-in supports DASH AES-CBC, CENC, CBCS and Apple Sample encryption formats.

7. The method of claim 1, wherein the SM-DRM Trustlet and the t-DRM API are components of the DRM that interface and are supported by an Android platform Application Program Interface (API), wherein the Android platform includes the Android 4.3, 4.4, 5.X and 6.X media framework.

8. The method of claim 1, wherein the t-Crypto Plug-in supports DASH AES-CBC, CENC, CBCS and Apple Sample encryption formats.

* * * * *